(12) United States Patent
Bharitkar

(10) Patent No.: US 11,586,411 B2
(45) Date of Patent: Feb. 21, 2023

(54) SPATIAL CHARACTERISTICS OF MULTI-CHANNEL SOURCE AUDIO

(71) Applicant: Hewlett-Packard Development Company, L.P., Spring, TX (US)

(72) Inventor: Sunil Bharitkar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,333

(22) PCT Filed: Aug. 30, 2018

(86) PCT No.: PCT/US2018/048929
§ 371 (c)(1),
(2) Date: Oct. 13, 2020

(87) PCT Pub. No.: WO2020/046349
PCT Pub. Date: Mar. 5, 2020

(65) Prior Publication Data
US 2021/0191685 A1    Jun. 24, 2021

(51) Int. Cl.
*G06F 3/16* (2006.01)
*G10L 19/008* (2013.01)
*H04S 3/00* (2006.01)

(52) U.S. Cl.
CPC ............ *G06F 3/165* (2013.01); *G10L 19/008* (2013.01); *H04S 3/008* (2013.01); *H04S 2420/07* (2013.01)

(58) Field of Classification Search
CPC ..................................... G06F 3/165; G06F 3/16
See application file for complete search history.

(56) References Cited

U.S. PATENT DOCUMENTS

| 5,754,666 | A | 5/1998 | Nakagawa |
| 9,622,014 | B2 * | 4/2017 | Chabanne ............... H04S 3/008 |
| 10,199,047 | B1 * | 2/2019 | Clark ........................ H03G 9/24 |
| 10,827,295 | B2 * | 11/2020 | Boehm .................... H04S 7/302 |
| 2004/0071299 | A1 | 4/2004 | Yoshino |
| 2009/0080666 | A1 | 3/2009 | Uhle |
| 2013/0195276 | A1 | 8/2013 | Ojala |
| 2016/0267914 | A1 * | 9/2016 | Hu ......................... G10L 19/038 |
| 2016/0330560 | A1 * | 11/2016 | Chon .................... G10L 19/008 |
| 2017/0105082 | A1 * | 4/2017 | Kim .......................... H04S 3/02 |

(Continued)

FOREIGN PATENT DOCUMENTS

| CN | 104205211 | 12/2012 |
| EP | 1110427 | 8/2004 |

(Continued)

*Primary Examiner* — Olisa Anwah
(74) *Attorney, Agent, or Firm* — Quarles & Brady LLP

(57) ABSTRACT

In some examples, an audio control system can include a first set of resources, a second set of resources and a controller. The first set of resources can generate a frequency energy band representation of a multi-channel source audio input. Additionally, the second set of resources can determine at least a value representing a strength of correlation between multiple channels of the multi-channel source audio input. Moreover, the audio output controller can determine a set of control parameters for tuning sound creation from an audio signal generator to reflect a set of spatial characteristics of the source audio input, based on the frequency energy band representation and the first value.

19 Claims, 4 Drawing Sheets

(56) References Cited

U.S. PATENT DOCUMENTS

| | | | |
|---|---|---|---|
| 2019/0132674 A1* | 5/2019 | Vilkamo | H04S 3/00 |
| 2019/0289417 A1* | 9/2019 | Tomlin | G06F 3/165 |
| 2020/0178015 A1* | 6/2020 | McGrath | H04R 5/04 |
| 2020/0184981 A1* | 6/2020 | Jansson Toftgård | G10L 19/008 |
| 2020/0322743 A1* | 10/2020 | Cengarle | H04S 3/008 |

FOREIGN PATENT DOCUMENTS

| | | |
|---|---|---|
| WO | 2006/060279 A1 | 6/2006 |
| WO | WO-2012164272 | 12/2012 |
| WO | WO-2013181115 | 5/2013 |
| WO | WO-2017064367 | 4/2017 |
| WO | WO-2018060549 | 4/2018 |

* cited by examiner

SPATIAL CHARACTERISTICS OF MULTI-CHANNEL SOURCE AUDIO

BACKGROUND

Audio content is often delivered in a multi-channel format (e.g., Dolby 5.1 or a 7.1 surround sound format) for output on a multi-channel sound system.

BRIEF DESCRIPTION OF THE DRAWINGS

The disclosure herein is illustrated by way of example, and not by way of limitation, in the figures of the accompanying drawings in which like reference numerals refer to similar elements, and in which.

Figure 1A:
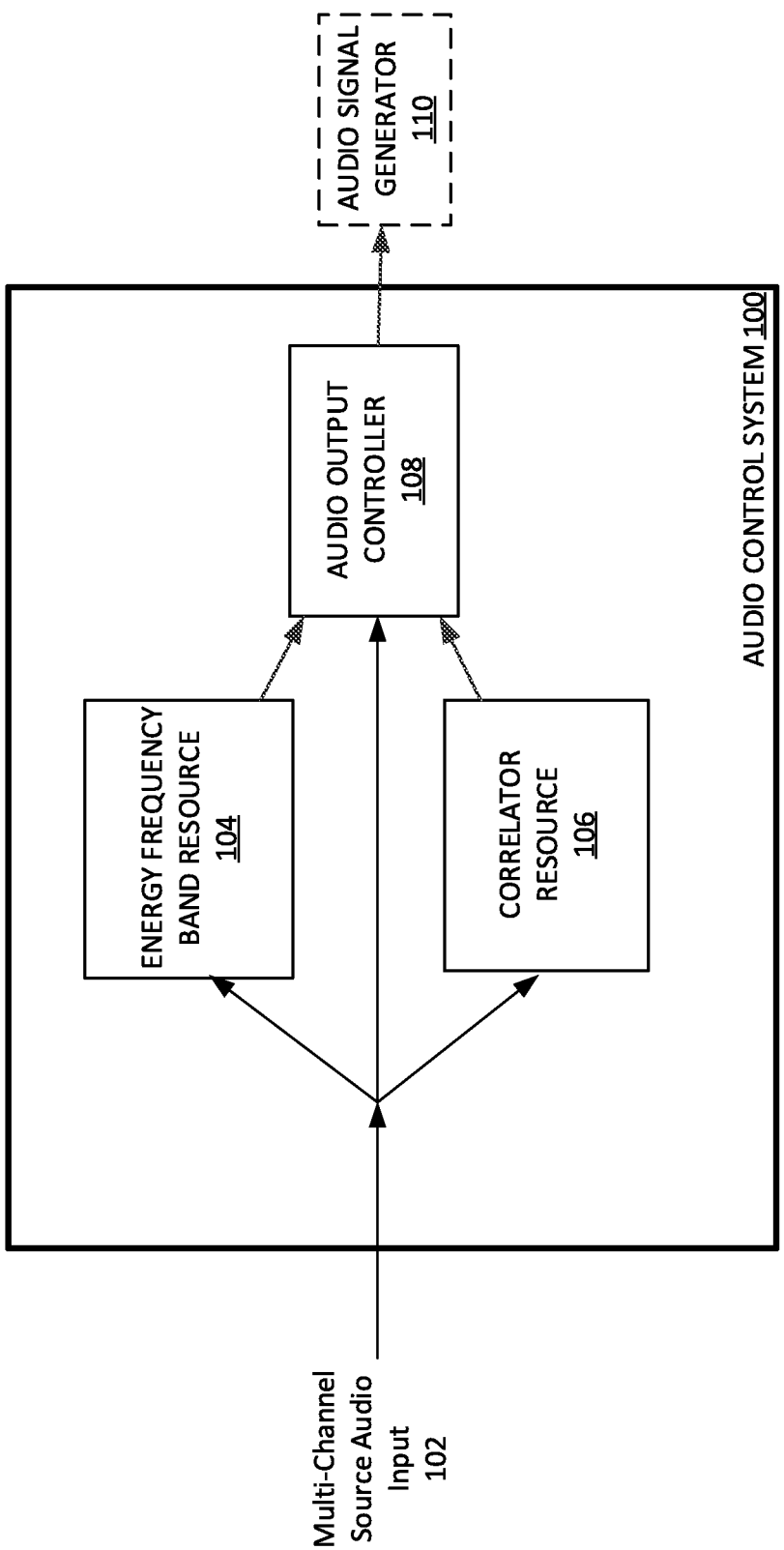
FIG. 1A illustrates an example audio control system for reformatting a multi-channel source audio input into a multi-dimensional audio signal.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

A multi-channel source audio input can be manually reformatted or calibrated into a multi-dimensional audio signal that, when rendered by a mono or stereo audio system, emulates a calibrated sound field arising from a distributed or multi-channel sound systems that may otherwise be optimized for the multi-channel audio source input. Examples provide for an audio control system to automate the reformatting or calibration of a multi-channel source audio input (e.g., Dolby 5.1 or a 7.1 surround sound signal) into the multi-dimensional audio signal. The audio control system can reformat a multi-channel source audio input 102 by generating a frequency band energy representation of the multi-channel source audio input. Additionally, the audio control system can determine a strength of correlation of each channel of the multi-channel source audio input. Based on the frequency band energy representation and the strength of correlation between each channel of the multi-channel source audio input, the audio control system can tune an audio signal generator, using a trained machine learning model, such that sound creation rendered from the audio signal generator reflects spatial characteristics of the multi-channel source audio input.

As described by various examples, the audio control system can operate on a mono or stereo or even a multi-channel audio system to render sound, in a manner that emulates a calibrated sound field arising from by a distributed or multi-channel sound systems that may otherwise be optimized for the multi-channel audio source input. In such examples, the sound rendered from the audio signal generator that was tuned by the audio control system can emulate a sound from an audio signal generator that was manually tuned by a human operator. Among other benefits, the audio control system can reformat the multi-channel audio source input into a multi-dimensional audio signal that is faster and more efficient than manual processes, such as a human operator manually reformatting or calibrating the multi-channel audio source input.

Examples described herein provide that methods, techniques, and actions performed by a computing device are performed programmatically, or as a computer-implemented method. Programmatically, as used, means through the use of code or computer-executable instructions. These instructions can be stored in a memory resource of the computing device. A programmatically performed step may or may not be automatic.

Additionally, examples described herein can be implemented using programmatic modules, engines, or components. A programmatic module, engine, or component can include a program, a sub-routine, a portion of a program, or a software component or a hardware component capable of performing stated tasks or functions. As used herein, a module or component can exist on a hardware component independently of other modules or components. Alternatively, a module or component can be a shared element or process of other modules, programs, or machines.

Moreover, examples described herein can utilize specialized computing devices, including processing and memory resources. For example, examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, examples described herein may be implemented through the use of instructions that are executable by a processor. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1A illustrates an example audio control system for reformatting a multi-channel source audio input into a multi-dimensional audio signal. As illustrated in FIG. 1A, audio control system 100 can reformat multi-channel source audio input 102 (e.g., a 5.1 or 7.1 surround sound format) into a multi-dimensional audio signal. Multi-channel source audio input 102 can be characterized by a set of spatial parameters that originally is tuned for sound creation by a particular configuration and/or distribution of audio output devices (e.g., a multi-channel audio system). Specific examples of such spatial parameters include current output, user level, limiter related parameters (e.g., parameters related to a predetermined threshold that the level of signal is limited to), International Telecommunication Union (ITU) out (parameters for ITU standard surround sound output), ITU binaural (parameters for ITU standard binaural or stereo sound output), Tomlison Holman's eXperiment (THX) (parameters for THX certified surround sound output), left/right binaural, side binaural, low frequency effects channel, output, multiband dynamic range compression, upfront upmix (e.g., parameters for increasing the number of channels related to the upfront channel), center upmix (e.g., parameters for increasing the number of channels related to the center channel), and surround upmix (e.g., parameters for increasing the number of channels related to the surround channel, and shelving parameters for filters to reduce or increase above a predetermined frequency (e.g., ITU standards).

Audio control system 100 can include resources (e.g., hardware components, such as integrated circuits or specialized integrated circuits, and/or software or logic stored on the hardware components, such as software stored on a non-transitory computer-readable medium) to reformat or adjust multi-channel source audio input 102 into a multi-dimensional audio signal that preserves the physical characteristics of some or all of the spatial characteristics or parameters. For example, audio control system 100 can include a first set of resources (energy frequency band resource (EFB) 104) to generate a frequency energy band representation of multi-channel source audio input 102), a second set of resources (correlator resource) 106 to determine at least a value representing a strength of correlation between multi-channel source audio input 102, audio output controller 108 to determine a set of control parameters for tuning sound creation to reflect a set of spatial characteristics or parameters of multi-channel source audio input 102. As described by some examples, audio output controller 108 can determine the set of control parameters based on the frequency energy band representation and the representative value of the strength of correlation between individual channels of multi-channel source audio input 102.

In some examples, a first set of resources (EFB resource 104) can process each channel of the multi-channel source audio input 102 (e.g., surround-left channel, surround-right channel, front-left channel, front-right channel, rear-center channel and/or front-center channel) to determine the frequency energy band representations of each channel of multi-channel source audio input 102 and the represented value of the strength of correlation between each individual channels of multi-channel source audio input 102, respectively.

In some examples, a first set of resources (EFB resource 104) can process each channel of the multi-channel source audio input 102 (e.g., surround-left channel, surround-right channel, front-left channel, front-right channel, rear-center channel and/or front-center channel) to determine a frequency energy band representations of each channel of multi-channel source audio input 102. For example, the first set of resources (EFB resource 104) can analyze single or multiple frequency bands of each channel of the multi-channel source audio input 102 to obtain an energy representation of the multi-channel source audio input. The first set of resources (EFB resource 104) can include a bank of auditory filters. Additionally, each channel of multi-channel source audio input 102 can be an input to the bank of auditory filters to output a set of predetermined frequencies of each channel. For example, multi-channel source audio input 102 can include a surround-left channel audio signal and a front-left channel audio signal and EFB resource 104 can include a first bank of auditory filters and a second bank of auditory filters. EFB resource 104 can apply the first bank of auditory filters to the surround-left channel audio signal to output a set of predetermined frequencies for the surround-left channel audio signal. Additionally, EFB resource 104 can apply the second bank of auditory filters to the front-left channel audio signal to output a set of predetermined frequencies for the front-left channel audio signal. In some examples, the first set of resources (EFB resource 104) can generate a frequency energy band representation of each channel of multi-channel source audio input 102 by utilizing the set of predetermined frequencies of each channel. For example, EFB resource 104 can generate a frequency band representation for the left surround-left channel audio signal based on the set of predetermined frequencies for the surround-left channel audio signal. Additionally, EFB resource 104 can generate a frequency band representation for the front-left channel audio signal, based on the set of predetermined frequencies for the front-left channel audio signal.

In some examples, a second set of resources (correlator resource 106) can processing each channel of the multi-channel source audio input 102 to determine a represented value of the strength of correlation between each individual channels of multi-channel source audio input 102. For example, multi-channel source audio input can include audio signal for a surround-right channel and a front-right channel. Additionally, in such an example, the second set of resources (correlator resource 106) can determine the strength of correlation and a representative value of the strength of correlation between the surround-right channel audio signal and the front-right channel audio signal.

Audio control system 100 can include audio output controller 108 to determine a set of control parameters that can reformat multi-channel source audio input 102. Additionally, audio output controller 108 determines the set of control parameters based on a frequency energy band representation of each channel of multi-channel source audio input 102 and the strength of correlation between each channel of multi-channel source audio input 102. In some examples audio control system 100 can include hardware components (e.g., integrated circuits or specialized integrated circuits) and/or software or logic stored on the hardware components 9 e.g., software stored on non-transitory computer-readable medium) to determine the set of control parameters that can reformat multi-channel source audio input 102.

Audio signal generator 110 can utilize a set of control parameters from audio output controller 108 to tune sound creation from audio signal generator 110 to reflect a set of spatial characteristics of multi-channel source audio input 102. In some examples, audio signal generator 110 can include hardware components, such as integrated circuits and/or specialized integrated circuits, and/or software or logic stored on the hardware components (e.g., software stored on non-transitory computer-readable medium), to tune sound creation, based on the set of control parameters.

Figure 1B:
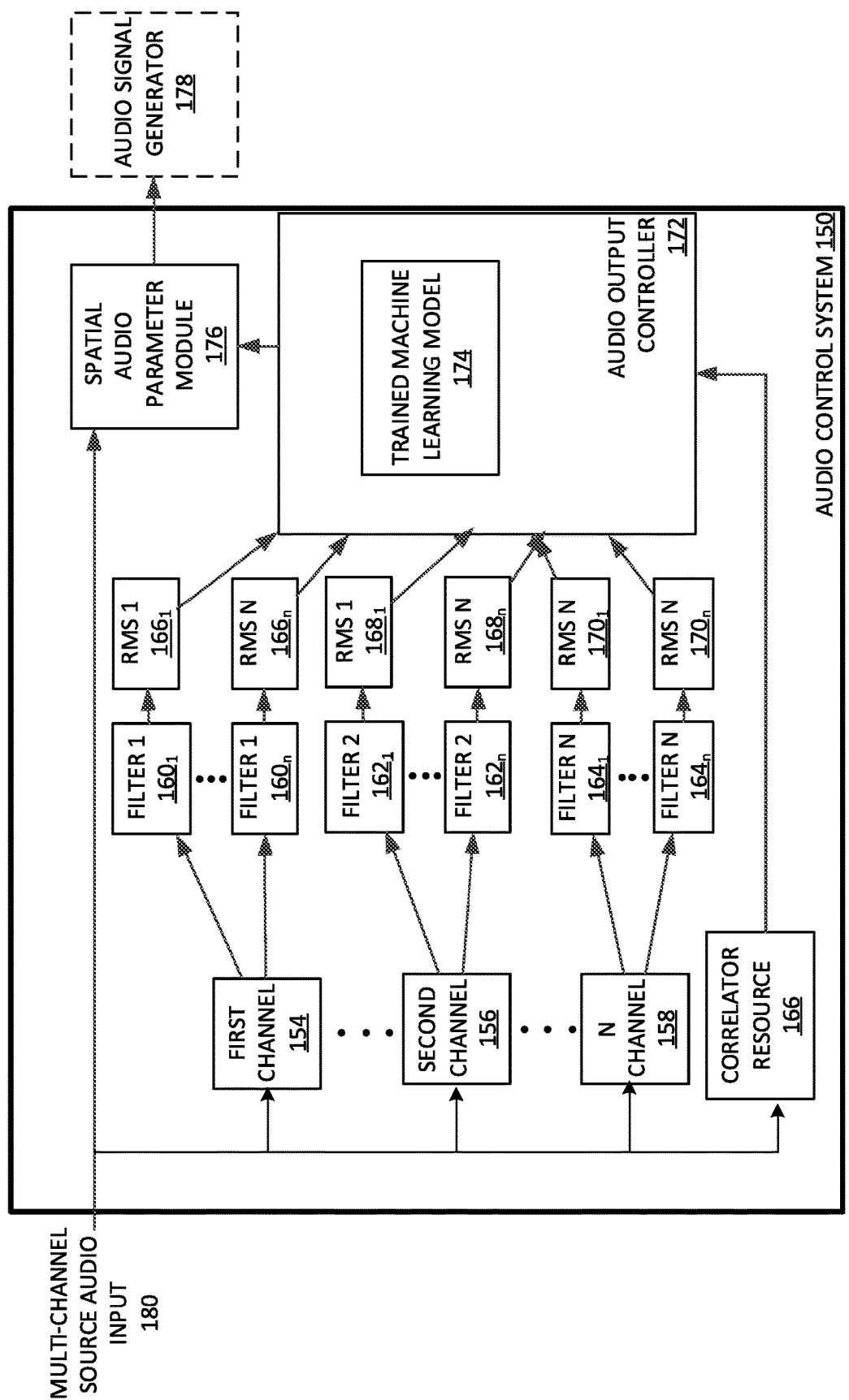
FIG. 1B illustrates another example of an audio control system for reformatting a multi-channel source audio input into a multi-dimensional audio signal.

FIG. 1B illustrates an example of a variation of audio control system for reformatting a multi-channel source audio input into a multi-dimensional audio signal. Similar to FIG. 1A, FIG. 1B, illustrates audio control system 150 that can reformat multi-channel source audio input 180 (e.g., a 5.1 or 7.1 surround sound format) into a multi-dimensional audio signal. In some examples, multi-channel source audio input 180 can include a set of spatial parameters that optimizes the output of sound from multi-channel source audio input 180 by a distributed and/or a suitably configured audio system.

As illustrated in FIG. 1B, audio control system 100 can include a banks of auditory filters (e.g., filter 1 $160_1, \ldots, 160_n$, filter 2 $162_1, \ldots, 162_n, \ldots$, filter N $164_1, \ldots, 164_n$) and corresponding root-mean square module (e.g., RMS 1 $166_1, \ldots, 166_n$, RMS 2 $168_1, \ldots, 168_n, \ldots$, RMS N $168_1, \ldots,$ RMS $168_n$) to generate a frequency energy band representation of multi-channel source audio input 180, correlator resource 166 to determine at least a value representing a strength of correlation between multi-channel source audio input 180, audio output controller 172 to determine a set of control parameters for tuning sound creation to reflect a set of spatial characteristics of multi-channel source audio input 180, and spatial audio parameter module 176 to utilize the set of control parameters to reformat multi-channel source audio input 180 to a multi-dimensional audio signal.

Additionally, similar to FIG. 1A, audio control system 152 can reformat multi-channel source audio input 180 into a multi-dimensional audio signal by processing each channel of the multi-channel source audio input 180 to determine a frequency energy band representation of each channel of multi-channel source audio input 180. Audio output controller 172 can utilize the frequency energy band representation to determine a set of control parameters for tuning multi-channel source audio input 180 to determine a set of control parameters for tuning sound creation to reflect a set of spatial characteristics or parameters of multi-channel source audio input 102.

In some examples, each channel of multi-channel source audio input 180 (e.g., surround-left channel, surround-right channel, front-left channel, front-right channel, rear-center channel and/or front-center channel) can be an input to a separate bank of auditory filters (e.g., a front-center channel audio signal can be an input to filter 1 $160_1, \ldots, 160_n$ and a front-right channel audio signal can be an input to filter 2 $162_1, \ldots, 162_n$) to output a set of predetermined frequencies of each channel. In such examples, each bank of auditory filters can include a bank of band-pass filters. In such examples, the bank of band-pass filters can mimic a human auditory filter-bank, so that the output of each bank of auditory filter mimics that how a human ear filters sound. Examples of band-pass filter banks include a ⅓-octave filter-bank, ⅙th-octave filter-bank, ¹⁄₁₂-th octave filter-bank, critical band filter-bank, equivalent rectangular bandwidth, and gammatone filter-bank.

Each set of predetermined frequencies of each channel of multi-channel source audio input 180 can be processed by a corresponding root-mean square module (e.g., RMS 1 $160_1, \ldots, 160_n$, RMS 1 $162_1, \ldots, 162_n, \ldots$, RMS N $164_1, \ldots,$ RMS $164_n$) to generate a frequency energy band representation of each channel. For example, each set of predetermined frequencies of each channel can be an input to a corresponding root-mean square module. An example of a root-mean square function that the root-mean square module can utilize to generate a frequency energy band representation of each channel includes:

$$rms_{(k)} = \left( \sqrt{\frac{1}{F} \sum_{p=1}^{F} (x_p^{(k)})^2} \right)$$

where rms(k) is the energy in a frame, represented by F (e.g., 480 samples/frame), and X is the output from each filter of the bank of auditory filters represented by k=1, ..., M.

A strength of correlation between each channel of multi-channel source audio input 180 (e.g., first channel 154, second channel 156 ... N channel 158) can be utilized by audio output controller 172 to determine a set of control parameters that can reformat multi-channel source audio input 180. For example, correlator resource 166 can obtain multi-channel source audio signal input 180 that includes first channel 154 and second channel 156. Correlator resource 166 can determine a strength of correlation between first channel 154 and second channel 156. In some examples, correlator resource 166 can utilize the following function to determine the strength of correlation between the front right channel and the rear center channel, as well as any other channels included in multi-channel source audio signal 180.

$$r_{i,j}(l) = \sum_{p=1}^{F} x_i(p) x_j(l+p)$$

where $r_{i,j}(l)$ is the strength of correlation, F is the frame, l is the lag and xi and $x_j$ are the channels being compared.

Additionally, correlator resource 166 can determine a set of decorrelation parameters for channels of multi-channel source audio input 180 that have a high degree of similarity or have a high strength of correlation. In some examples, audio output controller 172 can also utilize the decorrelation parameters to determine a set of control parameters that can reformat multi-channel source audio input 180. The strength of correlation between different channels of multi-channel source audio input 180 can indicate the degree of similarity between audio signals of the different channels. The greater the degree of similarity between the different channels or the heavier the correlation between the different channels can indicate a strong monoaural virtual source or phantom source. For example, a mono or stereo audio system can output multi-channel source audio input 180 with channels with audio signals that have a high degree of similarity with one another. As such, the mono or stereo audio system can output audio with a phantom source that can be perceived as being directly in front of a listener as opposed to the intended surround sound characteristics of multi-channel source audio input 180.

In some examples, correlator resource 166 can base a set of decorrelation parameters on an all-pass filter. All-pass filters can be applied to channels of multi-channel source audio input 180 that have a high strength in correlation to decorrelate them. The stronger the strength in correlation, the higher the order of the all-pass filter that may be applied to decorrelate highly correlated channels of multi-channel source audio input 180. In some examples, correlator resource 166 can base the decorrelation parameters on the following example all-pass filter pair H(z) and H̃(z) of order N and pole-coefficient A to decorrelate such channels.

$$H(z) = \frac{z^{-N} - \lambda}{1 - \lambda * z^{-N}}$$

$$\tilde{H}(z) = \frac{z^{-N} + \lambda}{1 + \lambda * z^{-N}}$$

In some examples, audio output controller 172 can determine the set of decorrelation parameters on the all-pass filter, based on the strength of correlation determined by correlator resource 166.

In some examples, correlator resource 166 can determine a strength of correlation between each channel of multi-channel source audio input 102 and a Kronecker delta function (δ(n)), by using an Euclidean norm (φ=‖$r_{i,j}$(n)−δ(n−F)‖2). Additionally, correlator resource 166 can also utilize the Euclidean norm as a scalar input to determine the strength of correlation between each channel of multi-channel source audio input 180 where $$\delta(n) = \begin{cases} 1: & n = 0 \\ 0: & n \neq 0 \end{cases}.$$

Audio control system 150 can include audio output controller 172 to determine a set of control parameters that can reformat multi-channel source audio input 180. Additionally, audio output controller 172 determines the set of control parameters based on a frequency energy band representation of each channel of multi-channel source audio input 180 and the strength of correlation between each channel of multi-channel source audio input 180.

In some examples, audio output controller 172 can utilize a trained machine learning model (e.g., trained machine learning model 174) to adjust the parameters of audio signal generator 178 to tune sound creation from audio signal generator 178. An example of a trained machine learning model (e.g., trained machine learning model 174) audio output controller 172 can include a neural network type of trained machine learning model. Additionally, audio output controller 172 can utilize trained machine learning model 174 to determine the set of control parameters, based on the frequency energy band representation of each channel of multi-channel source audio input 180 and the strength of correlation between each channel of multi-channel source audio input 180. For example, audio output controller 172 can utilize the output of the Euclidean norm indicating the strength of correlation between each channel of multi-channel source audio input 102 and the frequency energy band representation of each channel of multi-channel source audio input 180 as inputs for the trained machine learning model to determine the set of control parameters. In some examples, audio output controller 172 can further base the set of control parameters based on a set of decorrelation parameters determined by correlator resource 166. In other examples, audio output controller 172 can utilize trained machine learning model 174 to determine the set of decorrelation parameters that the set of control parameters can be further based on.

A machine learning model can be trained with the output of the machine learning model. In some examples, the machine learning model can be trained by parameters obtained from a human operator. In some examples, the machine learning model can adjust its own internal parameters to minimize the difference between the estimated set of control parameters and a desired set of control parameters based on, for example, a frequency band energy representation of the multi-channel source audio input 180 and a strength of correlation between each channel of the multi-channel source audio input 180.

Audio signal generator 178 can utilize a set of control parameters from audio output controller 172 to tune sound creation from audio signal generator 178 to reflect a set of spatial characteristics (e.g., gain and ITU out) of multi-channel source audio input 180. In some examples, audio signal generator 178 can include hardware components, such as integrated circuits and/or specialized integrated circuits, and/or software or logic stored on the hardware components (e.g., software stored on non-transitory computer-readable medium) to tune sound creation, based on the set of control parameters.

In some examples, audio control system 150 can include spatial audio parameter module 176. Spatial audio parameter module 176 can reformat a set of spatial parameters of multi-channel source audio input 180 based on control parameters determined and generated by audio output controller 172. In some examples, the control parameters can specify gains or decorrelation parameters that are to be included in the reformatted set of spatial parameters. Spatial audio parameter module 176 can provide to audio signal generator 178 the reformatted set of spatial parameters along with the corresponding multi-channel source audio input 180.

Audio signal generator 178 can utilize a reformatted set of spatial parameters from spatial audio parameter module 176 to reformat multi-channel source audio input 102 into a multi-dimensional audio signal for a mono or stereo audio system. That way a sound created from the multi-dimensional audio signal reflects the spatial characteristics of multi-channel source audio input 180. The multi-dimensional audio signal can cause the mono or stereo audio system to output a sound that emulates a distributed or multi-channel sound system that may otherwise be optimized for multi-channel source audio input 102.

Methodology

Figure 2:
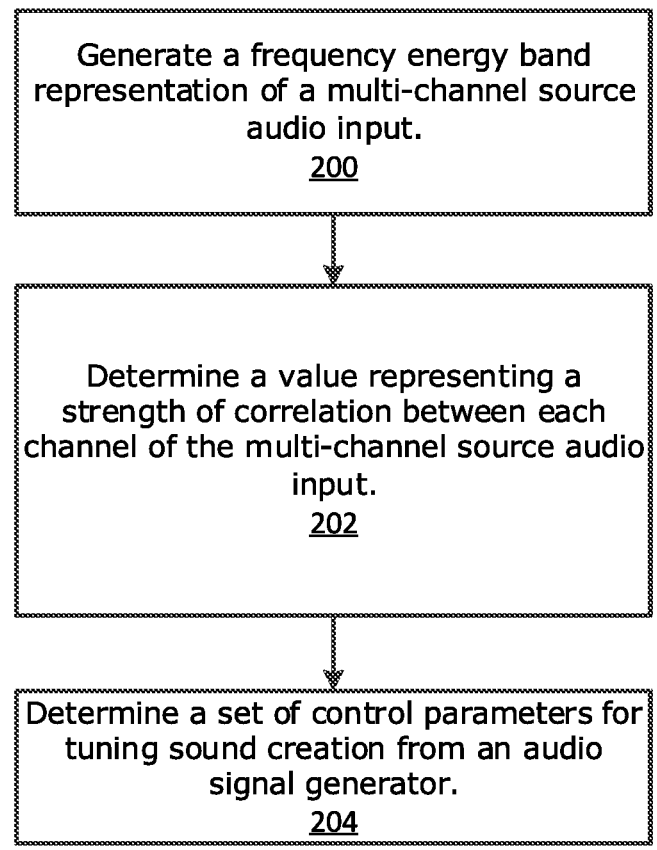
FIG. 2 illustrates an example method for reformatting a multi-channel source audio input into a multi-dimensional audio signal.

FIG. 2 illustrates an example method for reformatting a multi-channel source audio input into a multi-dimensional audio signal. In below discussion of FIG. 2, reference may be made to reference characters representing features as shown and described with respect to FIG. 1A for the purpose of illustrating a suitable component for performing the example method as being described.

In some examples, audio control system 100 can generate a frequency energy band representation of a multi-channel source audio input (200). For example, audio control system 100 can include a first set of resources (EFB resource 104) to determine and generate a frequency energy band representation of each channel of multi-channel source audio input 102 (e.g., surround-left channel, surround-right channel, front-left channel, front-right channel, rear-center channel and/or front-center channel).

Additionally, audio control system 100 can determine a value representing a strength of correlation between each channel of the multi-channel source audio input (202). For example, audio control system 100 can include correlator resource 106 to determine at least a value representing a strength of correlation between each channel of multi-channel source audio input 102.

Based on a value representing a strength of correlation between each channel of a multi-channel source audio input and a frequency energy band representation of the multi-channel source audio input, audio control system 100 can determine a set of control parameters for tuning sound creation from audio signal generator 110 (204). In some examples, audio control system 100 can include audio output controller 108 to determine the set of control parameters, based on a frequency energy band representation of each channel of multi-channel source audio input 102 and the value representing the strength of correlation between each channel of multi-channel source audio input 102. In some examples, audio output controller 108 can utilize a trained machine learning model to determine the set of control parameters, based on the frequency energy band representation of each channel of multi-channel source audio input 102 and the strength of correlation between each channel of multi-channel source audio input 102.

Hardware Diagram

Figure 3:
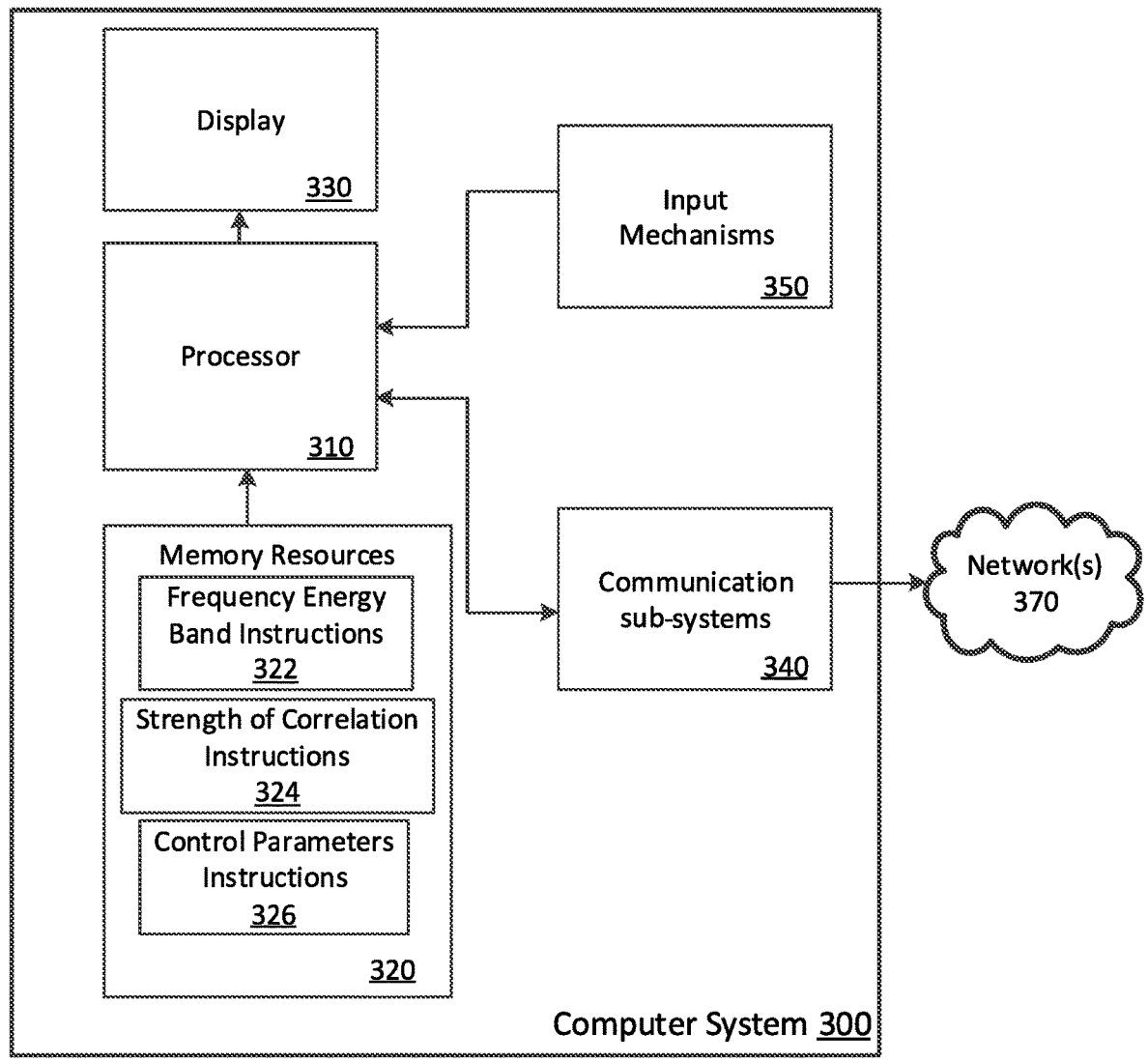
FIG. 3 illustrates a computer system upon which aspects described herein may be implemented.

FIG. 3 is a block diagram that illustrates a computer system upon which examples described herein may be implemented. In one embodiment, computer system 300 may correspond to a mobile computing device, such as a cellular device that is capable of telephony, messaging, and data services. Computer system 300 can correspond to a device operated by a user. Examples of such devices include smartphones, handsets, tablet devices, or in-vehicle computing devices that communicate with cellular carriers. Computer system 300 includes processor 310, memory resources 320, display component 330 (e.g., such as a touch-sensitive display device), communication sub-systems 340 (including wireless communication systems), and audio output devices 350 (e.g., speakers). In some variations, the audio output devices have a single virtual or physical location with respect to a housing of the computer system. In other variations, the audio output devices 350 may have a limited number of distribution points, as compared to, for example, a number of channels which exist in a multi-channel audio input.

In some examples, communication sub-systems 340 can send and receive cellular data over network(s) 370 (e.g., data channels and voice channels). Communication sub-systems 340 can include a cellular transceiver and one or more short-range wireless transceivers. Processor 310 can receive multi-channel audio content from an audio source (not illustrated in FIG. 3) that, for example, is linked to the computer system 300 by network(s) 370, such that multi-channel audio input is received by the computer system 300 via communication sub-systems 340. In other examples, the multi-channel audio input can be retrieved from memory resources 320, or received via a microphone (not shown).

Memory resources 320 can store instructions for a variety of operations. For example, as illustrated in FIG. 3, memory resources 320 can include frequency energy band instructions 322, strength of correlation instructions 324 and control parameters instructions 326. Additionally, processor 310 can execute frequency band instructions 322, strength of correlation instructions 324, and control parameters instructions 326 to perform operations for implementing a method, such as described with an example of FIG. 2. Still further, processor 310 can execute frequency energy band instructions 322, strength of correlation instructions 324 and control parameters instructions 326 to implement functionality for an audio control system 100, 150, such as described with examples of FIG. 1A and FIG. 1B. Processor 310 can execute the instructions to reformat multi-channel audio input (e.g., as received via communication sub-systems 340) into a multi-dimensional output that can, through use of audio output devices 350, create sound that reproduces the spatial characteristics of the multi-channel audio input.

Although specific examples have been illustrated and described herein, it will be appreciated by those of ordinary skill in the art that a variety of alternate and/or equivalent implementations may be substituted for the specific examples shown and described without departing from the scope of the disclosure. This application is intended to cover any adaptations or variations of the specific examples discussed herein.

What is claimed is:

1. An audio control system comprising:
a first set of resources to generate a frequency energy band representation of a multi-channel source audio input;
a second set of resources to determine at least a value representing a strength of correlation between each channel of the multi-channel source audio input; and
an audio output controller to determine a set of control parameters for tuning sound creation from an audio signal generator to reflect a set of spatial characteristics of the multi-channel source audio input, based on the frequency energy band representation and the value, wherein the controller utilizes a machine learning model to determine the set of control parameters.

2. The audio control system of claim 1, wherein the first set of resources includes a bank of auditory filters.

3. The audio control system of claim 2, wherein the bank of auditory filters is based on a basilar membrane.

4. The audio control system of claim 2, wherein an output of each filter in the bank of auditory filters is applied by a root-mean square function.

5. The audio control system of claim 2, wherein, the bank of auditory filters includes a first set of auditory filters to be applied to a first channel of the multi-channel source audio input.

6. The audio control system of claim 5, wherein the bank of auditory filters are band-pass filters.

7. The audio control system of claim 6, wherein the bank of auditory filters includes at least one of a ⅓-octave filter-bank, ⅙th-octave filter-bank, 1/12-th octave filter-bank, critical band filter bank, equivalent rectangular bandwidth, and gammatone filter-bank.

8. The audio control system of claim 1, wherein the second set of resources further determines a set of decorrelation parameters based on the value representing a strength of correlation between multiple channels of the multi-channel source audio input.

9. The audio control system of claim 1, wherein the controller further determines a set of decorrelation parameters based on the value representing a strength of correlation between multiple channels of the multi-channel source audio input.

10. The audio control system of claim 1, wherein the set of control parameters includes a parameter for gain and a parameter for decorrelation.

11. The audio control system of claim 1, wherein the multi-channel source audio input is in a 5.1 surround sound format.

12. The audio control system of claim 1, wherein the multi-channel source audio input is in a 7.1 surround sound format.

13. An audio device comprising:
an audio control component including:
   a first set of resources to generate a frequency energy band representation of a multi-channel source audio input;
   a second set of resources to determine at least a value representing a strength of correlation between each channel of the multi-channel source audio input;
   a controller to determine a set of control parameters, based on the frequency energy band representation and the value representing a strength of correlation between each channel of the multi-channel source audio input wherein the controller utilizes a machine learning model to determine the set of control parameters; and
an audio signal generator to tune sound creation to reflect a set of spatial characteristics of the multi-channel source audio input, based on the set of control parameters.

14. A method comprising:
generating a frequency energy band representation of a multi-channel source audio input;
determining a first value representing a strength of correlation between each channel of the multi-channel source audio input; and
determining a set of control parameters for tuning sound creation from an audio signal generator, based on the frequency energy band representation of the multi-channel source audio input and the value representing a strength of correlation between each channel of the multi-channel source audio input, wherein the set of control parameters are determined using a machine learning model.

15. The audio device of claim 13, wherein the first set of resources includes a bank of auditory filters.

16. The audio device of claim 13, wherein the second set of resources further determines a set of decorrelation parameters based on the value representing a strength of correlation between multiple channels of the multi-channel source audio input.

17. The audio device of claim 13, wherein the controller further determines a set of decorrelation parameters based on the value representing a strength of correlation between multiple channels of the multi-channel source audio input.

18. The method of claim 14, further comprising: determining a set of decorrelation parameters based on the value representing a strength of correlation between multiple channels of the multi-channel source audio input.

19. The method of claim 14, wherein the set of control parameters includes a parameter for gain and a parameter for decorrelation.

\* \* \* \* \*